Patented July 18, 1950

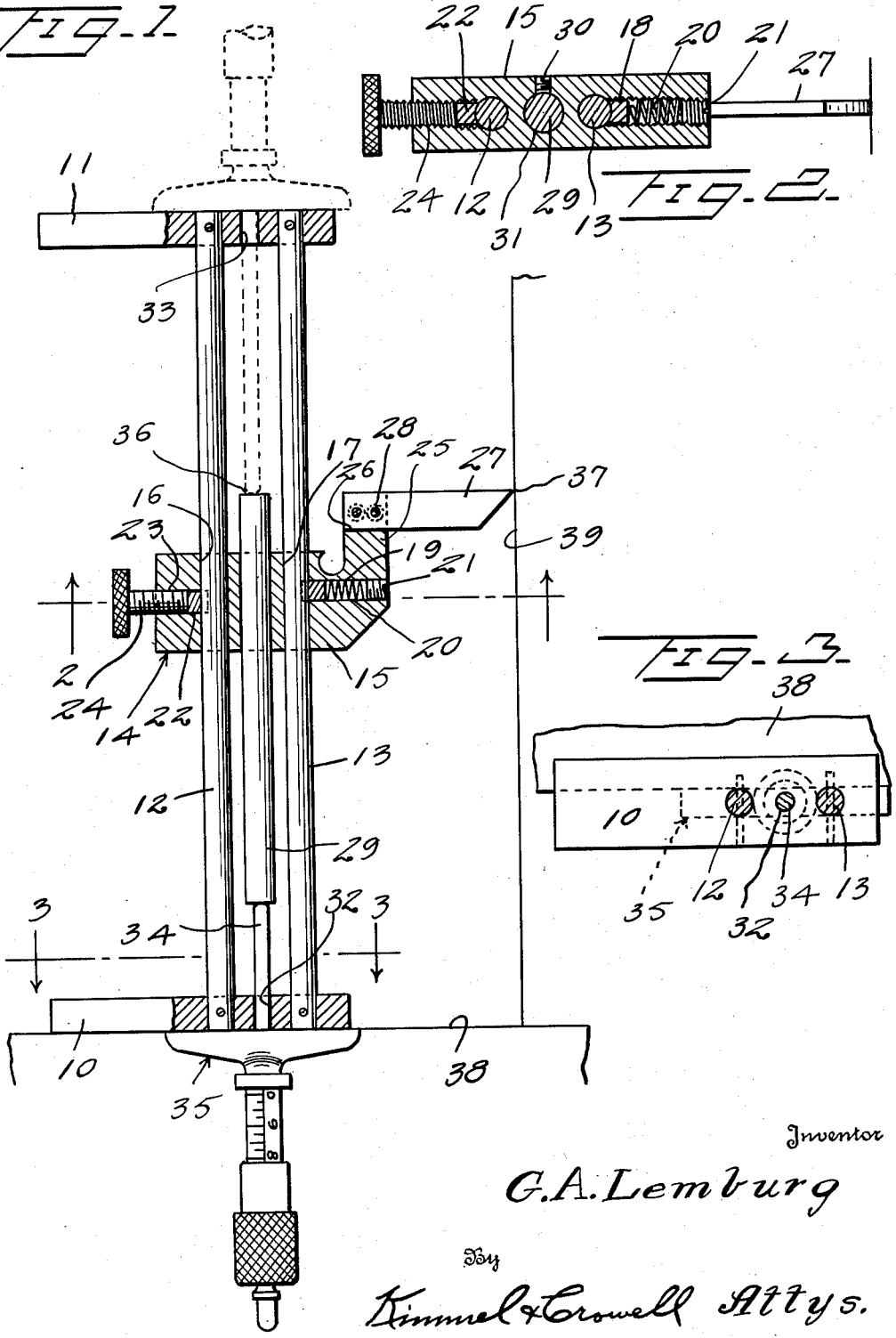

2,515,719

UNITED STATES PATENT OFFICE 2,515,719

MICRO HEIGHT GAUGE

Gustav Adolf Lemburg, Vista, Calif.

Application September 23, 1948, Serial No. 50,841

3 Claims. (Cl. 33—169)

This invention relates to a height gage and scriber designed for precision work.

An object of this invention is to provide a gage embodying a pair of base plates between which a pair of parallel guide rods are secured, with an adjustable slide or carrier engaging the rods, the carrier having fixed thereto a scriber or stylus for engagement with the work. The slide or carrier has fixed thereto a short rod disposed between the guide rods which is adapted to be engaged by a conventional micrometer depth gage, so that the scriber can be accurately positioned with respect to either of the base plates.

Another object of this invention is to provide in a gage of this kind a slidable scriber carrier which is frictionally held in its initially adjusted position, and may be firmly locked in adjusted position.

With the above and other objects in view, my invention consists in the arrangement, combination and details of construction disclosed in the drawing and specification, and then more particularly pointed out in the appended claims.

In the drawing,

Figure 1 is a detail side elevation, partly broken away and in section, of a height gage constructed according to an embodiment of this invention, Figure 2 is a sectional view taken on the line 2—2 of Figure 1, Figure 3 is a sectional view taken on the line 3—3 of Figure 1.

Referring to the drawing, the numerals 10 and 11 designate generally a pair of blocks constituting base members which are disposed in spaced apart parallel relation, being secured together by means of a pair of elongated rods 12 and 13. The rods 12 and 13 not only space the blocks 10 and 11 apart, but also provide a guide means for a scriber or stylus carrier 14.

The stylus carrier 14 comprises a block 15 formed with openings 16 and 17 through which the rods 12 and 13 respectively engage, and the block 15 is frictionally held against movement lengthwise of the rods 12 and 13 by means of a friction brake member 18 which is loosely disposed in an opening 19 formed in the block 15.

A spring 20 is disposed in the opening 19 and is tensioned by means of a screw 21. The block 15 is securely locked against movement lengthwise of the guide rods 12 and 13 by means of a locking member 22 disposed in an opening 23 formed in the block 15 and in which a locking screw 24 is threaded. The block 15 is formed with an upwardly projecting arm 25 having a slot 26 within which a scriber or stylus 27 is secured by fastening means 28.

An elongated bar 29 is fixed by fastening means 30 in an opening 31 formed in the block 15 between the openings 16 and 17. Preferably the bar 29 is of a length equal to substantially one-half the distance between the outer sides of the blocks 10 and 11.

In order to provide a means whereby the block 15 with the scriber or stylus 27 may be adjusted lengthwise of the guides 12 and 13, the blocks 10 and 11 are formed with openings 32 and 33 respectively, through which the depth measuring rod 34 of a micrometer depth gage 35 of conventional construction is adapted to engage. The micrometer depth gage 35 may be extended through either block 10 or 11, depending on the closest distance the bar 29 is to one of these blocks.

As shown in Figure 1, the lower end of the bar 29 is substantially close to the block 10, and the depth gage 35 is therefore, inserted through the block 10.

The upper end 36 of the bar 29 is in the same horizontal plane as the point 37 of the scriber 27. In this manner when the bar 29 is such a distance away from the block 10 that the depth gage 35 cannot contact the lower end of the bar 29, the depth gage may be extended through the opening 33 in the block 11. The exact distance of the scriber point 37 from the outer surface of the block 11 may be read directly on the gage member 35. Where the gage member 35 is extended through the block 10, the length of bar 29 must be added to the measurement read on the gage 35 to give the exact position of the scriber point 37.

In the use of this device, the carrier 14 is lengthwise adjusted along the guide rods 12 and 13, the clamping screw 24 being initially loosened so that the block 15 will be frictionally held by the frictional brake member 18. The block 15 may then be precision adjusted by means of the depth micrometer gage 35 which will abut against one end of the bar 29. When the carrier 14 has been precision adjusted by the micrometer 35, the carrier may be locked in its adjusted position by tightening of the clamping screw 24. The base member which may be either block 10 or 11 is then moved over a horizontal plane surface 38 and the scriber point 37 engaged with the vertical surface 39 of the work piece.

I do not mean to confine myself to the exact details of construction herein disclosed, but claim all variations falling within the purview of the appended claims.

What I claim is:

1. A height gage for use with a micrometer depth gage comprising a pair of spaced apart parallel plates, a pair of spaced apart parallel rods fixed between said plates, a slide engaging said rods, means adjusting said slide along said rods, a gage bar fixed to said slide between said rods and having a length less than the latter, and a scriber carried by said slide and having the point thereof coplanar with one end of said gage bar, said plates each having an opening therethrough in alignment with said gage bar whereby the gage element of the micrometer may be extended through an opening for contact with an end of said gage bar and a direct gage reading may be obtained from the micrometer.

2. A height gage for use with a micrometer depth gage comprising a pair of spaced apart parallel plates, a pair of spaced apart parallel rods fixed between said plates, a slide engaging said rods, means adjusting said slide along said rods, a gage bar fixed to said slide between said rods and having a length less than the latter, and a scriber carried by said slide and having the point thereof coplanar with one end of said gage bar, said plates each having an opening therethrough in alignment with said gage bar whereby the gage element of the micrometer may be extended through an opening for contact with an end of said gage bar and a direct gage reading may be obtained from the micrometer, one end of said gage bar projecting a greater distance from said slide than the other end whereby the gage element of the micrometer may be extended through either plate, the length of said gage bar being added to the micrometer reading when the gage element is engaged with said other end of said gage bar.

3. A height gage for use with a micrometer depth gage comprising a pair of spaced apart parallel plates, a pair of spaced apart parallel rods fixed between said plates, a slide engaging said rods, means adjusting said slide along said rods, a gage bar fixed to said slide between said rods and having a length less than the latter, and a scriber carried by said slide and having the point thereof coplanar with one end of said gage bar, said plates each having an opening therethrough in alignment with said gage bar whereby the gage element of the micrometer may be extended through an opening for contact with an end of said gage bar and a direct gage reading may be obtained from the micrometer, and a spring-pressed brake carried by said slide engaging one of said rods for holding said slide against free movement on said rods.

GUSTAV ADOLF LEMBURG.

REFERENCES CITED

The following references are of record in the file of this patent:

UNITED STATES PATENTS

| Number | Name | Date |
|---|---|---|
| 1,103,265 | Corff | July 14, 1914 |
| 1,163,512 | Cubiac | Dec. 7, 1915 |

FOREIGN PATENTS

| Number | Country | Date |
|---|---|---|
| 104,447 | Sweden | May 5, 1942 |
| 546,157 | Great Britain | June 30, 1942 |